US007757099B2

(12) United States Patent
Greco et al.

(10) Patent No.: US 7,757,099 B2
(45) Date of Patent: Jul. 13, 2010

(54) VALIDATING AN ENCRYPTION KEY FILE ON REMOVABLE STORAGE MEDIA

(75) Inventors: Paul Merrill Greco, Tucson, AZ (US); Hiroshi Itagaki, Kanagawa-ken (JP); James Mitchell Karp, Tucson, AZ (US); Hirokazu Nakayama, Kanagawa-ken (JP); Toshiyuki Shiratori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 11/530,019

(22) Filed: Sep. 7, 2006

(65) Prior Publication Data

US 2008/0065906 A1    Mar. 13, 2008

(51) Int. Cl.
*G06F 21/00* (2006.01)
(52) U.S. Cl. ........................ 713/193; 380/277
(58) Field of Classification Search ........................ None
See application file for complete search history.

(56) References Cited

U.S. PATENT DOCUMENTS

| | | | |
|---|---|---|---|
| 6,023,643 A | | 2/2000 | Jesionowski |
| 6,134,660 A * | | 10/2000 | Boneh et al. ............ 713/193 |
| 6,295,361 B1 | | 9/2001 | Kadansky et al. |
| 6,487,686 B1 * | | 11/2002 | Yamazaki et al. .......... 714/703 |
| 6,567,914 B1 | | 5/2003 | Just et al. |
| 6,915,434 B1 | | 7/2005 | Kuroda et al. |
| 6,918,040 B2 | | 7/2005 | Ries et al. |
| 6,950,522 B1 | | 9/2005 | Mitchell et al. |
| 7,013,389 B1 | | 3/2006 | Srivastava et al. |
| 2002/0164035 A1 | | 11/2002 | Yokota et al. |
| 2003/0005317 A1 * | | 1/2003 | Audebert et al. ............ 713/193 |
| 2003/0026021 A1 * | | 2/2003 | Goodman et al. ............ 360/48 |
| 2003/0081787 A1 | | 5/2003 | Kallahalla et al. |
| 2003/0099362 A1 | | 5/2003 | Rollins |
| 2005/0071591 A1 | | 3/2005 | Goodman et al. |
| 2005/0086471 A1 | | 4/2005 | Spencer |

(Continued)

OTHER PUBLICATIONS

U.S. Patent Application entitled "Selective Encryption of Data Stored on Removable Media in an Automated Data Storage Library", U.S. Appl. No. 11/470,670, filed Sep. 7, 2006, by inventors B. G. Goodman, J.A. Fisher, and L.G. Jesionowski.

(Continued)

*Primary Examiner*—Gilberto Barron, Jr.
*Assistant Examiner*—David Le
(74) *Attorney, Agent, or Firm*—Rabindranath Dutta; Konrad, Raynes & Victor LLP (57) ABSTRACT

Provided are a method, system, removable storage cartridge, and article of manufacture for validating an encryption key file on a removable storage media. Copies of an encryption key file are written to multiple locations on a removable storage media, wherein data is encrypted and decrypted using an encryption key included in the encryption key file. A validation operation is performed on the copy of the encryption key file at one of the key locations, wherein the key locations comprise the locations on the removable storage media to which the encryption key files were written. In response to the copy of the encryption key file not validating, a command is sent to cause the data and valid copies of the encryption key file to be rewritten to a new storage media.

16 Claims, 6 Drawing Sheets

U.S. PATENT DOCUMENTS

| | | |
|---|---|---|
| 2005/0204161 A1 | 9/2005 | Caronni |
| 2005/0207570 A1 | 9/2005 | Yamamoto et al. |
| 2005/0226423 A1 | 10/2005 | Li et al. |
| 2006/0005049 A1* | 1/2006 | Randell ........................ 713/193 |
| 2006/0041932 A1* | 2/2006 | Cromer et al. .................. 726/6 |
| 2006/0062383 A1 | 3/2006 | Kaneda et al. |
| 2006/0195205 A1* | 8/2006 | Ito ............................... 700/94 |
| 2007/0180272 A1* | 8/2007 | Trezise et al. ................ 713/193 |

OTHER PUBLICATIONS

Advanced Encryption Standard (AES), Federal Information Processing Standards Publication 197, Nov. 26, 2001, pp. 1-51.

"IBM TotalStorage Enterprise Tape System 3592—SCSI Reference" IBM Corporation, Document No. GA32-0466-02, Oct. 2005.

D.A. McGrew, et al., "The Galois/Counter Mode of Operation (GCM)", May 31, 2005, pp. 1-44.

"IEEE P1619.1/D8 Draft Standard Architecture for Encrypted Variable Block Storage Media", IEEE, 2006, pp. 1-26.

U.S. Patent Application entitled "Configuring a Storage Drive to Communicate With Encryption and Key Managers", U.S. Appl. No. 11/530,022, filed Sep. 7, 2006, by inventors B.G. Goodman, G.A. Jaquette, L.G. Jesionowski and P.M. Greco.

U.S. Patent Application entitled "Keyless Copy of Encrypted Data", U.S. Appl. No. 11/530,008, filed Sep. 7, 2006, by inventors P.M. Greco and G.A. Jaquette.

U.S. Patent Application entitled "Key Generation and Retrieval Using Key Servers", U.S. Appl. No. 11/530,006, filed Sep. 7, 2006, by inventors P.M. Greco, .T.J. Hahn and G.A. Jaquette.

U.S. Patent Application entitled "Maintaining Encryption Key Integrity", U.S. Appl. No. 11/530,012, filed Sep. 7, 2006, by inventors P.M. Greco, M.J. Sandberg and S.J. Schaffer.

U.S. Patent Application entitled "Encryption Policy Based on Data Context Recognition", U.S. Appl. No. 11/530,011, filed Sep. 7, 2006, by inventors P.M. Greco, G.A. Jaquette, and W.E. Rhoten.

U.S. Patent Application entitled "Detection and Handling of Encryption Key and Initialization Vector", U.S. Appl. No. 11/530,010, filed Sep. 7, 2006, by inventors P.M. Greco, M.J. Sandberg and S.J. Schaffer.

U.S. Patent Application entitled "Verification of Encryption Key", U.S. Appl. No. 11/530,009, filed Sep. 7, 2006, by inventors P.M. Greco, S. Halevi and G.A. Jaquette.

U.S. Patent Application entitled "Automatically Filling a Drive Table", U.S. Appl. No. 11/530,013, filed Sep. 7, 2006, by inventors T.J. Hahn and G.A. Jaquette.

U.S. Patent Application entitled "Recovering Remnant Encrypted Data on a Removable Storage Media", U.S. Appl. No. 11/530,021, filed Sep. 7, 2006, by inventors E.M. Dawson, P.M. Greco, G.A. Jaquette and J.M. Karp.

U.S. Patent Application entitled "Data Library Background Operations System Apparatus and Method", U.S. Appl. No. 11/470,964, filed Sep. 7, 2006, by inventors B.G. Goodman and L.G. Jesionowski.

U.S. Patent Application entitled "Secure Transmission of Cryptographic Key", U.S. Appl. No. 11/530,014, filed Sep. 7, 2006, by inventors P.M. Greco, M.J. Sandberg, and S.J. Schaffer.

U.S. Patent Application entitled "Rekeying Encryption for Removable Storage Media", U.S. Appl. No. 11/470,994, filed Sep. 7, 2006, by inventors J.A. Fisher, B.G. Goodman, G.A. Jaquette, and L.G. Jesionowski.

U.S. Patent Application entitled "Apparatus, System, and Method for Self-Describing Heterogeneous Magnetic Tape Formatting", U.S. Appl. No. 11/679,736, filed Feb. 27, 2007, by inventors, G.A. Jaquette, S.J. Schaffer and T. Shiratori.

U.S. Patent Application entitled "System and Method for Processing User Data in an Encryption Pipeline", U.S. Appl. No. 11/688,445, filed Mar. 20, 2007, by inventors P.M. Greco, S. Halevi, and G.A. Jaquette.

U.S. Patent Application entitled "Method, System and Apparatus for Dynamically Validating a Data Encryption Operation", U.S. Appl. No. 11/285,408, filed Nov. 22, 2005, by inventors P.M. Greco, M.J. Sandberg, and S.J. Schaffer.

U.S. Patent Application entitled "Use of Indirect Data Keys for Encrypted Tape Cartridges", U.S. Appl. No. 11/742,819, filed May 1, 2007, by inventors P.M. Greco, S. Halevi, and G.A. Jaquette.

* cited by examiner

Key Location Information

VALIDATING AN ENCRYPTION KEY FILE ON REMOVABLE STORAGE MEDIA

BACKGROUND OF THE INVENTION

1. Field of the Invention

The present invention relates to a method, system, and article of manufacture for validating an encryption key file on removable storage media.

2. Description of the Related Art

Data stored on removable tape cartridges may be encrypted by an encryption engine to protect the data. Data encryption is especially useful for businesses that store personal data on their customers. Recent government regulations place requirements and legal obligations on companies storing personal data to report missing data or prevent the data from being stolen.

One concern with encrypting data on a tape cartridge is maintaining and managing copies of encryption keys for numerous tape cartridges encrypted with different encryption keys. In the current art, a host system coupled to the tape drive may utilize a database or other data structure to associate encryption keys and storage cartridges whose data was encrypted with the associated encryption key. However, if the database table becomes corrupt or is lost, then the data on the tape cartridges cannot be recovered.

There is a need in the art for improved techniques for managing encryption keys for removable storage media, such as tape cartridges.

SUMMARY

Provided are a method, system, removable storage cartridge, and article of manufacture for maintaining and validating copies of an encryption key file used to encrypt data on a removable storage media on the removable storage media. Copies of an encryption key file are written to multiple locations on a removable storage media, wherein data is encrypted and decrypted using an encryption key included in the encryption key file. A validation operation is performed on the copy of the encryption key file at one of the key locations, wherein the key locations comprise the locations on the removable storage media to which the encryption key files were written. In response to the copy of the encryption key file not validating, a command is sent to cause the data and valid copies of the encryption key file to be rewritten to a new storage media.

DETAILED DESCRIPTION

Figure 1:
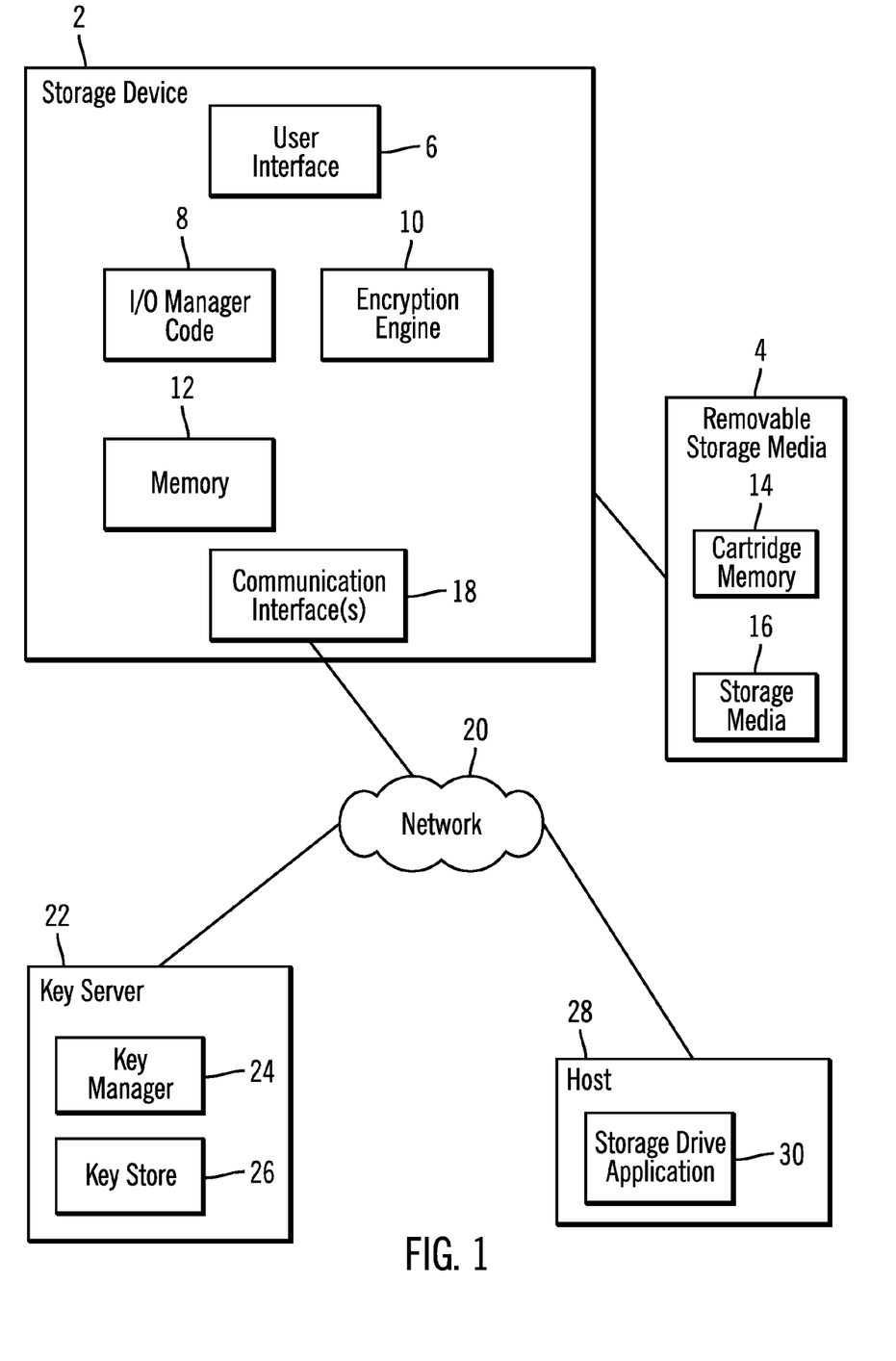
FIG. 1 illustrates an embodiment of a computing environment including a storage drive.

FIG. 1 illustrates an embodiment of a storage drive 2, which may comprise a removable storage drive, for interfacing with a removable storage media 4. The storage drive 2 may include a user interface 6 comprising one or more buttons or keys for interacting with the storage drive 2. The user interface 6 may include an eject button for manually unloading removable media; up/down buttons for navigating a list of items, enter/exit buttons for selecting items or exiting from a menu or list; one or more status displays, such as a light or LED (Light Emitting Diode), a numeric display, and alphanumeric display, etc. Additionally, a user interface may be presented to the storage device 2 on a connected computer system.

The storage drive 2 includes Input/Output (I/O) manager code 8 to perform read/write operations with respect to the coupled removable storage media 4, an encryption engine 10, and a memory 12, such as a Flash Memory, Electronically Erasable Programmable Read Only Memory (EEPROM), battery backed up Random Access Memory (RAM), etc. The memory 12 may store I/O data and configuration information used to read and write data to the coupled removable storage media 4. The I/O manager code 8 may use the encryption engine 10, which performs operations to encrypt and decrypt data on a coupled removable storage media 4 using one or more encryption keys. In certain embodiments, the encryption keys are buffered in the encryption engine 10. The encryption engine 10 may use one or more encryption algorithms, which may include, but are not limited to, DES (Data Encryption Standard), AES (Advanced Encryption Standard), RSA (Rivest Shamir Adleman), and other suitable encryption algorithms known in the art.

The removable storage media 4 may comprise a cartridge referred to as a data storage media cartridge. An example of a data storage media cartridge that is widely employed in removable automated data storage libraries for mass data storage is a magnetic tape cartridge. The removable storage media 4 may include a cartridge memory 14 comprising a non-volatile memory to store encryption keys and other information and a storage media 16 comprising any type of suitable media on which data may be stored and which may serve as removable media, including but not limited to magnetic media (such as magnetic tape or disks), optical media (such as optical tape or disks), electronic media (such as PROM, EEPROM, flash PROM, MRAM, CompactFlash™, Smartmedia™, Memory Stick™, etc.), or other suitable media.

The storage drive 2 includes one or more communication interfaces 18 to enable communication with different external devices, such as computer systems, a storage library, etc. There may be multiple interfaces for connecting to different devices or host computers. In addition, there may be redundant interfaces to improve reliability, availability, connectivity, or performance. In one embodiment, the interfaces 18 may comprise different interfaces and different communication protocols. The one or more communication interfaces 18 may comprise serial, parallel, or optical interfaces such as RS-232, USB (Universal Serial Bus), serial or parallel ATA (AT Attachment), SCSI (Small Computers System Interface), SAS (Serial Attached SCSI), Fibre Channel, IEEE 1394 (FireWire or iLink), IEEE 1284 (parallel port), etc. In addition, communication interface(s) 18 may comprise network or wireless interfaces such as Ethernet, CAN (Controller Area Network), 802.11 (Wi-Fi), X.25 (WAN), Bluetooth, etc. The communication interface(s) 18 may be used to provide commands and/or data to the storage drive 2.

In the embodiment of FIG. 1, communication interface 18 enables communication with a network 20 through which the storage drive 2 may communicate with a key server 22 including a key manager 24 and a key store 26 and additional systems, such as host system 28. The host system may include a storage drive program 30 that communicates data and commands to the storage drive 2, such as a backup program, archival software, storage drive management program, or any other host application that is capable of sending read/write requests to the storage drive 2 for a coupled removable storage media. In an alternative embodiment, the communication interface(s) 18 may comprise a direct line connection to the key server 22 and/or host system 28.

Figure 2:
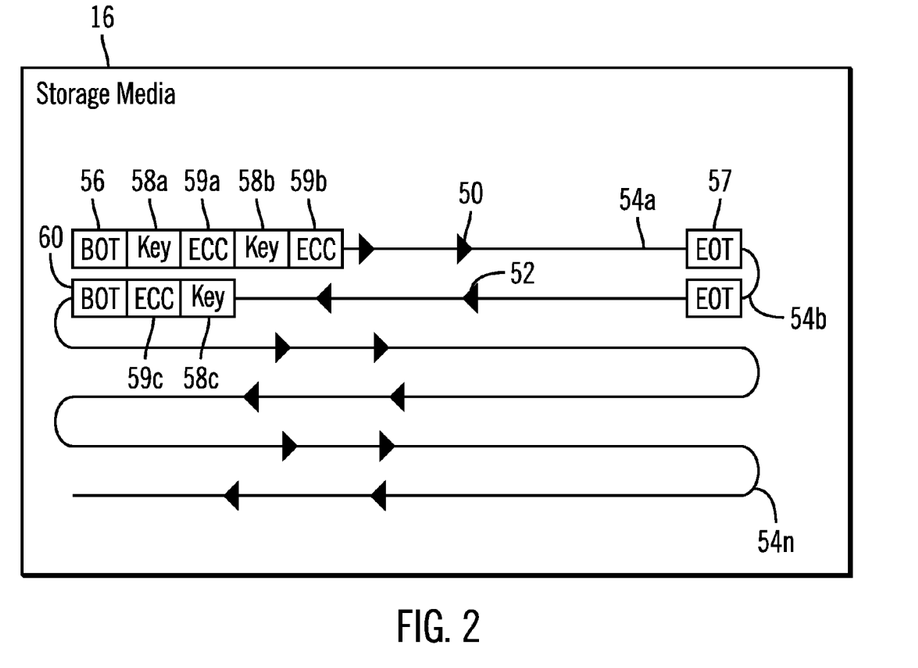
FIG. 2 illustrates an embodiment of a format of a storage media storing copies of encryption keys.

FIG. 2 illustrates an embodiment of how data may be written when the storage media 16 comprises a sequential access storage media 16, such as tape, in which data may be written in a forward 50 and reverse 52 directions along the length of the media in a serpentine fashion in wraps 54a, 54b . . . 54n, where each wrap 54a, 54b, 54n comprises one or more tracks written along the length of the storage media in one direction. FIG. 2 shows an example of six wraps, although in actual implementations there may be more than six wraps written along the length of the tape or storage media. The storage media 16 has a beginning of tape (BOT) position 56 indicating the beginning of the tape and an end of tape (EOT) position 57 indicating the end of the tape on the first wrap 54a. The EOT and BOT may comprise abstract beginning and ending positions on the tape. Between the BOT and EOT positions on each wrap is the customer data.

Following the BOT position 56 in the forward direction 50 are two copies of the same encryption key file 58a and 58b written one after the other in the forward direction on the first wrap 54a following the BOT position 56. An encryption key file may comprise an externally encrypted data key either currently in use for blocks on the volume or previously used for blocks on the volume. Alternatively, the encryption key file may comprise an unencrypted version of the data key. Another copy of the encryption key file 58c is written before the BOT position 60 on the first wrap 54b in the reverse direction. The encryption key file copies 58a, 58b, 58c may be formatted with error correction codes 59a, 59b, 59c. The error correction codes 59a, 59b, 59c may further include Run Length Limited (RLL) codes and other error correction formatting techniques known in the art. In an alternative embodiment, there may be one ECC used to validate all the copies 59a, 59b, 59c of the encryption key file.

In an alternative embodiment, the encryption key file may be written in the forward direction before the BOT position 56. Further, the encryption key file written in the reverse direction may be written after the BOT position 60. In one embodiment, the encryption key file may be written on multiple forward and reverse wraps, such as all wraps 54a . . . 54n. Each encryption key file may comprise a single indexable key (unencrypted or encrypted) or a series of indexable keys (unencrypted or encrypted, currently valid or old).

The copies 58a, 58b, 58c of the encryption key file comprise one or a series of encrypted data keys, each key encrypted using one or more key encryption keys (KEKs) known and maintained by the remote key manager 24. The unencrypted data key would have been used to encrypt and decrypt data in the coupled removable storage media 4. Alternatively, the encryption key file copies 58a, 58b, 58c may comprise one or a series of unencrypted data keys that may be directly used to encrypt and decrypt data in the removable storage media 4.

The copies 58a, 58b, 58c of the encryption key file and their ECCs 59a, 59b, 59c may be stored on different forward and reverse wraps than shown in FIG. 2 and at different locations on the wrap, such as between the EOT and BOT, at the EOT and/or other positions on the storage media 16. Further there may be multiple copies of the key file containing multiple indexable keys (plain or encrypted), the indexable keys being either currently valid for blocks on the tape or previously valid for blocks on the tape, and the aggregate key file copies may be written in multiple directions and in multiple longitudinal places on tape (before physical BOT, beginning of customer data, or after the BOT, or near physical EOT) for additional protections.

Writing the copies 58a, 58b, 58c of the encryption key file in different directions on the sequential access media increases the likelihood that at least one valid copy of the encryption key file can be recovered. If the read head is corrupted, then the read head may not be able to read a copy of the encryption key written in one direction, either forward or reverse. However, it is unlikely that a corrupted read head cannot read the additional copy of the encryption key file written in the opposite direction of the key which could not be read.

To obtain the unencrypted encryption key, i.e., data key, the storage drive 2 may provide a copy 58a, 58b, 58c of the encryption key file to the key manager 24. The key manager 24 may then access the KEK for the provided encrypted data key from the key storage 26 to use to decrypt the encrypted data key file and then send the decrypted data key to the storage drive 2 or other component requesting an unencrypted data key. The encryption engine 10 may buffer the unencrypted data key to use to decrypt/encrypt data, and then discard the unencrypted data key after using the data key for a session or operation. The key store 26 may comprise a software element such as an array, structure, database, file, etc. In addition, a key store may also comprise a hardware element such as memory, media, a hard drive, storage device, etc.

Figure 3:
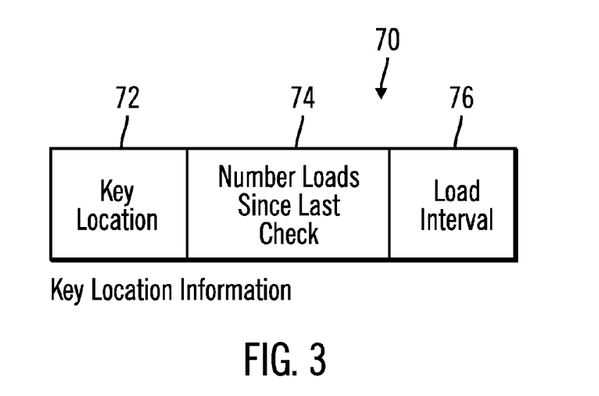
FIG. 3 illustrates an embodiment of key location information providing information on the copies of the encryption keys stored on the storage media.

FIG. 3 illustrates an embodiment of key location information 70 the storage drive 2 maintains for each copy 58a, 58b, 58c of the encryption key file written to the storage media 16. The information 70 includes a key location 72 having the address of the copy 58a, 58b, 58c of the encryption key file on the storage media 16; a number of loads 74 of the removable storage media 4 that have occurred since the last validation operation was performed on the copy of the encryption key file at the key location 72; and a load interval 76 indicating a maximum number of loads that should occur between validation operations with respect to the copy of the encryption key file. Each key location 72 may have a different load interval 76 to have the validation operation performed with respect to the copies 58a, 58b, 58c during different load operations so as to limit the number of validation operations to prevent too many validation operations from causing an undue delay in the load operation. The key location 72 information may be stored in the removable storage media 4 to which the information applies, e.g., in the cartridge memory 14 or storage media 16, and/or in the storage drive memory 12.

Figure 4:
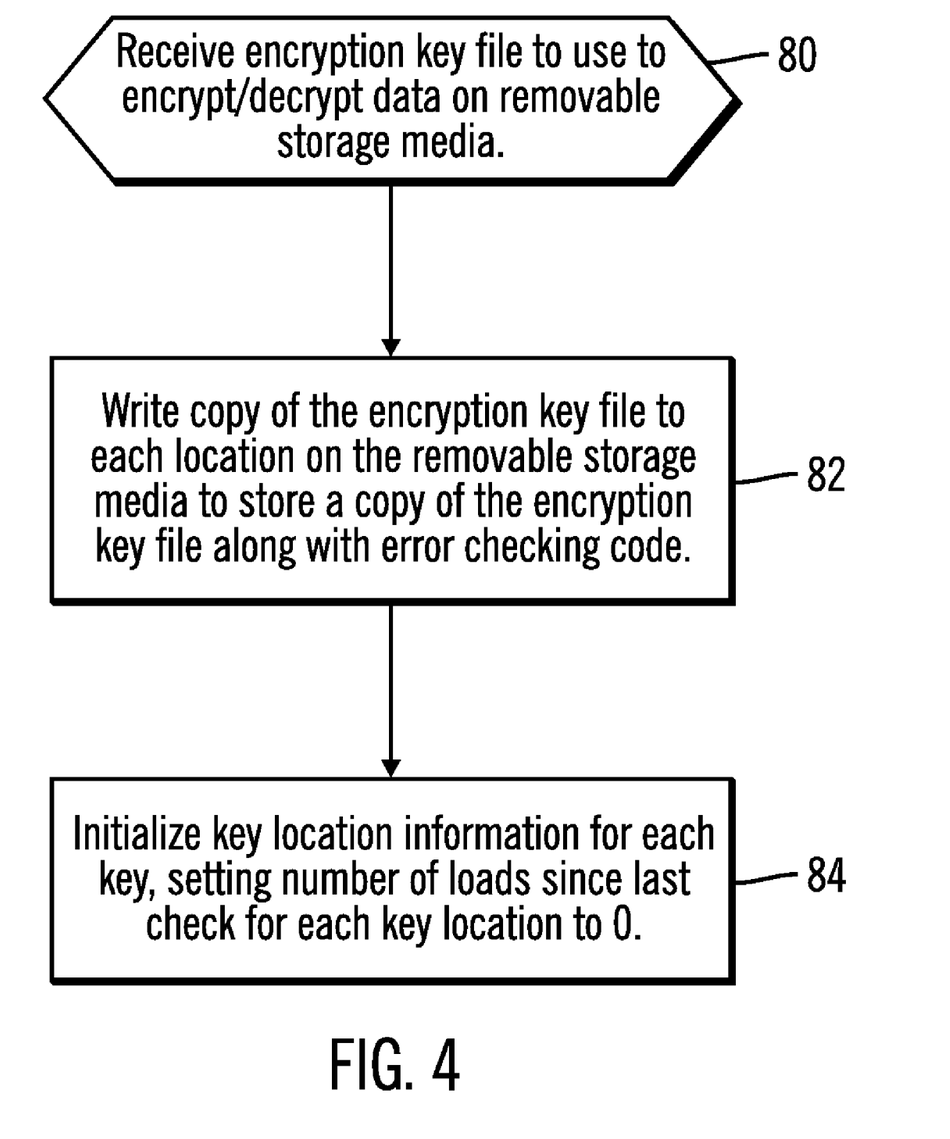
FIG. 4 illustrates an embodiment of operations to store copies of a received encryption key on the storage medium to which the encryption key applies.

FIG. 4 illustrates an embodiment of operations performed by the I/O manager code 8 or other code to manage encryption key files. Upon receiving (at block 80) an encryption key file, which may comprise an encrypted encryption key or unencrypted data key, to use to encrypt/decrypt data on a coupled removable storage media 4, the I/O manager 8 writes (at block 82) a copy of the encryption key file to each location 58a, 58b, 58c on the removable storage media with an error checking code 59a, 59b, 59c for the copy. The copies of the encryption key file 58a, 58b are written in a forward write direction along the storage media 16 and copy 58c is written in a reverse direction. The I/O manager 8 or other code initializes the key location information 70 for each key location 58a, 58b, 58c including a copy of the encryption key file, setting the number of loads since last check 74 for each key location 58a, 58b, 58c to zero (at block 84). The load intervals 76 for each key location may comprise different integer values maintained by the I/O manager code in a non-volatile memory also storing configuration information.

Figure 5:
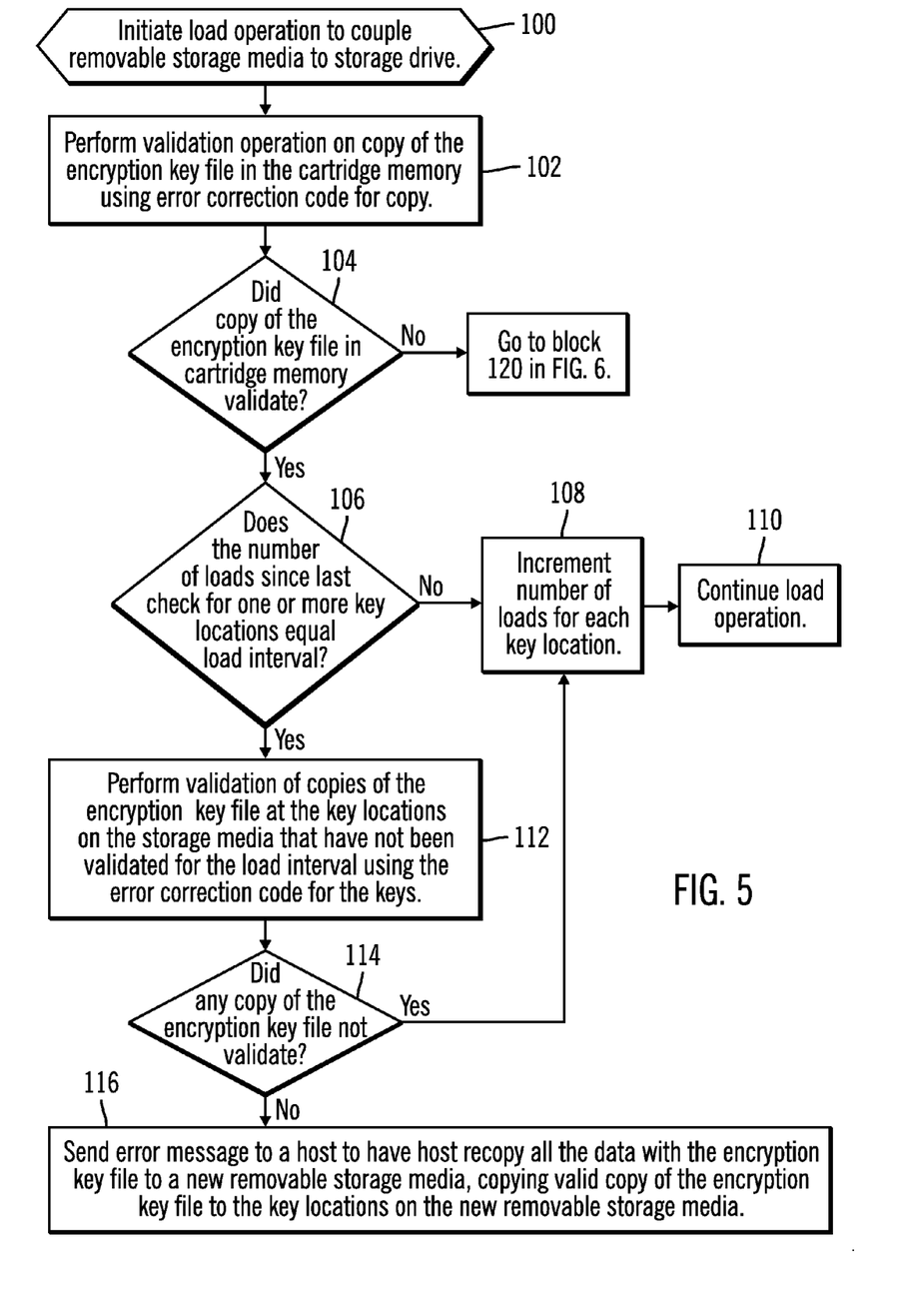
FIGS. 5 and 6 illustrate an embodiment of operations to validate the copies of the encryption key and use a validated copy.
Figure 6:
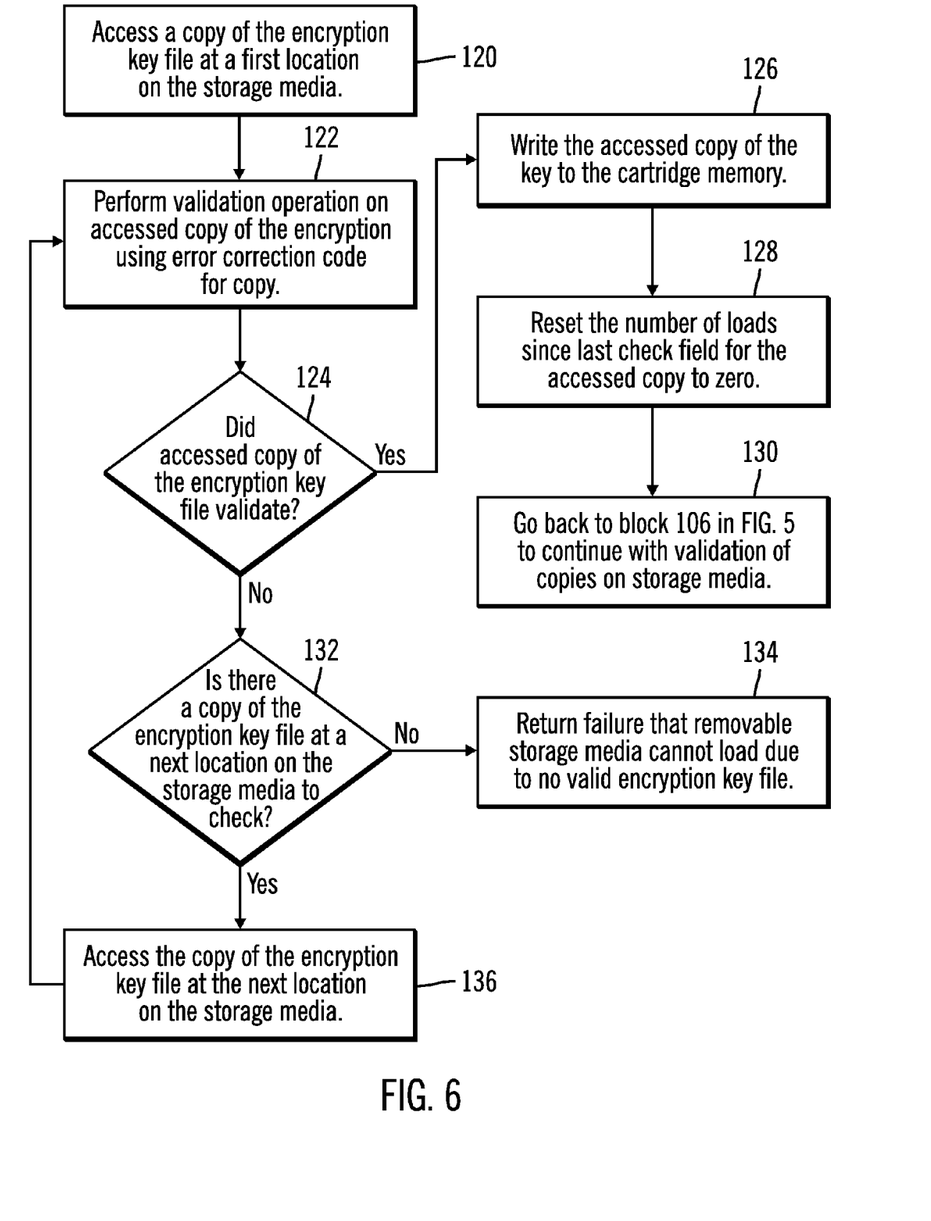

FIGS. 5 and 6 illustrate an embodiment of operations performed by the I/O manager 8 or some other code (e.g., the load code) to validate encryption key files for use as part of loading or coupling the removable storage media 4 to the storage drive 2 for access. Upon initiating (at block 100) the load operation, the I/O manager 8 performs a validation operation (at block 102) on the copy of the encryption key file in the cartridge memory 14 using the error correction code for the cartridge memory 14 copy. The validation operation may apply the error correction code to the copy of the encryption key file determine whether the copy of the encryption key file is valid. If (at block 104) the copy of the encryption key file in the cartridge memory 14 is valid, then the I/O manager 8 determines (at block 106) whether one of the copies of the encryption key file at one storage location 58a, 58b, 58c should be validated, which may involve determining whether the number of loads since last check 74 for one or more key locations is equal to the load interval 76 for the key location. If there are no encryption key file copies 58a, 58b, 58c that should be checked, i.e., the load interval number of loads has not occurred since the last validation check for any of the keys, then the number of loads 74 is incremented (at block 108) and the load operation continues (at block 110).

If (at block 106) there are one or more copies 58a, 58b, 58c of the encryption key file to validate, then the I/O manager 8 performs a validation operation (at block 112) on the copy of the encryption key file at the key locations on the storage media that have not been validated for the load interval using the error correction code for the keys. The validation operation may involve using the ECC 59a, 59b, 59c for the copy 58a, 58b, 58c subject to validation. If (at block 114) all the encryption key file copies 58a, 58b, 58c subject to the validation operation are validated, then control proceeds to block 108 to continue with the loading operation. Otherwise, if some of the encryption key file copies 58a, 58b, 58c subject to the validation operation did not validate, then the I/O manager 8 sends (at block 116) an error message to the host 28. In response, the host storage drive application 30 may issue commands to copy all the data with the copies of the encryption key file on the coupled removable storage media 4 to a new removable storage media, which would include a valid copy of the encryption key file to the key locations on the new removable storage media. In a yet further embodiment, the host may comprise an automated storage library having an autochanger mechanism to remove the currently coupled storage media 4 from the storage drive 2 and provide and load a new removable storage media at the storage drive 2 for the copy operation.

If (at block 104) the copy of the encryption key file in the cartridge memory 14 did not validate, then control proceeds to block 120 in FIG. 6 where the I/O manager 8 accesses (at block 120) a copy of the encryption key file at a first location 58a on the storage media 16. The first location 58a may comprise a physical location closest to the beginning of the tape (BOT) 56 on the first wrap 54a or at an alternative physical location. A validation operation is performed (at block 122) on the accessed copy 58a, 58b or 58c of the encryption key file using the error correction code (ECC) 59a, 59b, 59c stored with the copy. If (at block 124) the accessed copy is valid, then the I/O manager writes (at block 126) the accessed copy of the key to the cartridge memory 14 to provide a valid copy of the encryption key file to the cartridge memory 14 for use during encryption/decryption operations. If the valid encryption key file is an encrypted encryption key file, then the storage drive 2 may obtain the unencrypted encryption from the key manager 24 to store in the cartridge memory 14. The number of loads since last check field 74 for the accessed copy is reset (at block 128) to zero and control proceeds (at block 130) back to block 106 in FIG. 5 to continue with validation of copies 58a, 58b, 58c of the encryption key file.

If (at block 124) the accessed copy of the encryption key file did not validate, then a determination is made (at block 132) as to whether there is a copy 58b, 58c of the encryption key file at a next location on the storage media to check. The next location may comprise the physical location closest in the read direction to the previously accessed copy that did not validate. If (at block 132) there is no further copy 58b, 58c to check, then failure is returned (at block 134) indicating that the coupled removable storage media 4 cannot be loaded due to the absence of a valid encryption key file to use to decrypt the data on the storage media 16. If (at block 132) there is another copy 58b or 58c of the encryption key file that has not been considered, then the I/O manager 8 accesses (at block 136) the copy of the encryption key file at the next location on the storage media, where the next location may comprise the physical location closest in the read direction to the previously accessed copy that did not validate. Control then proceeds to block 122 to consider the next accessed copy 58b, 58c of the encryption key file.

Figure 7:
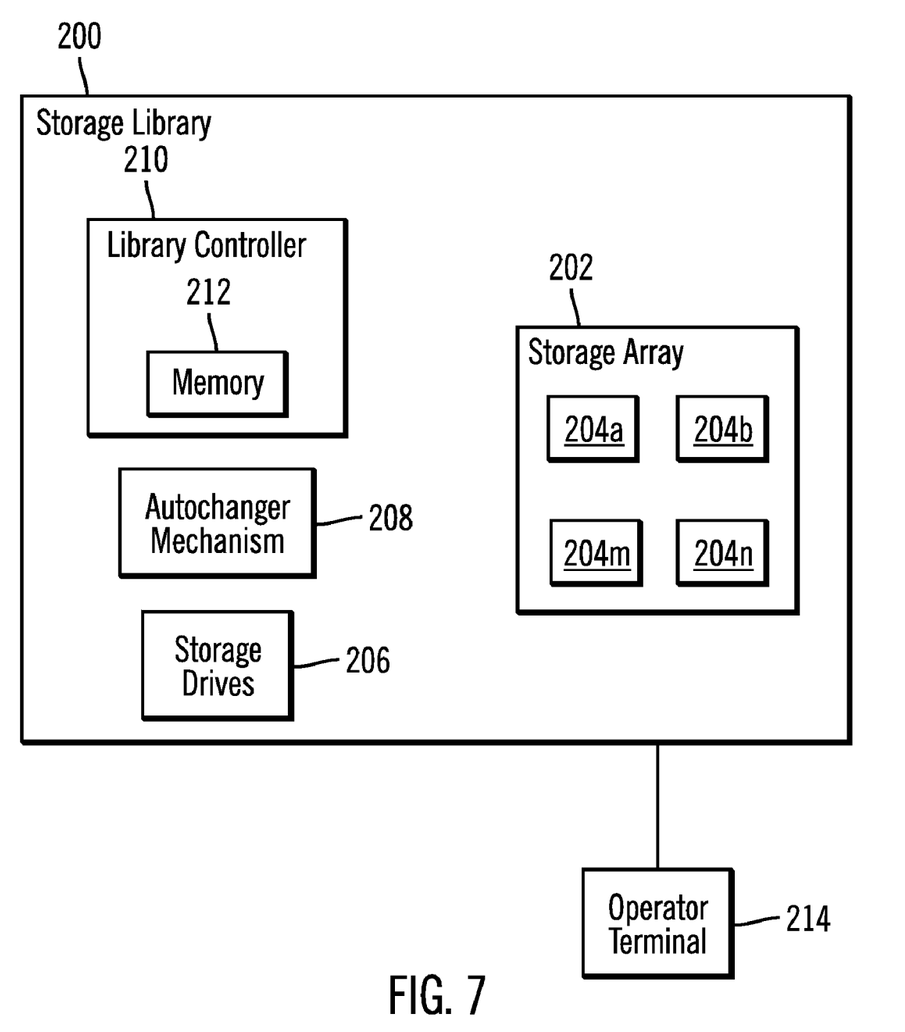
FIG. 7 illustrates an embodiment of an automated storage library.

FIG. 7 illustrates an embodiment of an automated storage library 200 including a storage array 202 of storage cells or slots in which removable storage media 204a, 204b . . . 204n may be placed; storage drives 206, such as a tape drive, optical disk drive or other removable media, to which a removable storage media is coupled to for access; an autochanger mechanism 208 to transfer removable storage media between the storage array 202 and storage drives 206, such as a picker assembly and carriage assembly; and a library controller 210 to control the library 200 component operations. An example of a library 200 is the IBM 3584 UltraScalable Tape Library. The storage drives 206 included in the library 200 may comprise instances of the storage drive 2 of FIG. 1 and the removable storage media 204a . . . 204n may comprise instances of the removable storage media 4 shown in FIG. 1.

In certain embodiments, the library controller 210 is comprised of a microprocessor and various controls and interfaces to control the operation of the components in the automated library 200, including the autochanger mechanism 208 and storage drives 204a, 204b . . . 204n. The library controller 210 utilizes a memory 212 to store various information, such as a storage media map maintaining information on the location of removable storage media in the library 200, including the contents of the library elements in the storage array 202. The library controller 210 may comprise a single processing unit, multiple redundant processing units, and/or multiple distributed processing units.

A library operator may directly control operations and the management of removable storage media 204a, 204b . . . 204n through an operator terminal 214 coupled to the library 200, consisting of a display device and keyboard, to interface with the library controller 210. The operator terminal 214 may comprise a computer, workstation, personal computer, palm computer, operator panel, entry keys and a display, web user interface, proprietary user interface, or any other device or interface capable of providing a user interface for the library 200. Additionally, a host system (not shown) may send commands to the library controller 208 to control the movement of media within the automated library 200. A host system (not shown) may also send commands to storage drives 206 to perform read and/or write operations on with respect to removable storage media 204a, 204b . . . 204n. The host system(s) may communicate with the library 200 and/or the storage drives 206 over one or more networks or interfaces.

With the described embodiments, the storage drive maintains multiple copies of the encryption key file to use to decrypt the data on the storage media to use in the event the copy of the encryption key file in the cartridge memory is no longer valid. Further described embodiments provide techniques to validate the stored copies of the encryption key files to increase the likelihood that at least one of the keys will be valid if needed. Further, in certain embodiments, the validation of the stored copies of the encryption key files is staggered to avoid undue delays in the load operation that could occur if multiple copies of the encryption key file were subject to validation during a load operation.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where one or more processors may read and execute the code from one or more computer readable media. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, MRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, the key manager 24 was maintained on a key server 22 separate from the storage drive 2. In an alternative embodiment, the key manager and key store may be implemented within code within the storage drive 2.

In the described embodiments, the validation of the copies of the encryption key file was performed during a load operation to couple the removable storage media 4 to the storage drive 2. In an alternative embodiment, the validation of the copies of the encryption key files may be performed at different times, such as during normal read/write operations or when unloading the removable storage medium 4 from the storage drive 2. In such case, the number loads since the last check 74 may comprise a counter for any type of operation to ensure that the copy of the encryption key file is validated within an interval number of occurrences of the monitored event, which may comprise an unload, load or other operation with respect to the removable storage media 4.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    maintaining, via a processor, an encryption key file, wherein data is capable of being encrypted and decrypted using an encryption key included in the encryption key file;
    writing, in a forward direction, a first copy of the encryption key file to a first key location on a removable storage media;
    writing, in a reverse direction, a second copy of the encryption key file to a second key location of the removable storage media in which the first copy of the encryption key file was written in the forward direction;
    performing a validation operation on the first copy of the encryption key file written at the first key location;
    in response to the first copy of the encryption key file not validating, performing the validation operation on the second copy of the encryption key file written to the second key location; and
    in response to the second copy of the encryption key file written to the second key location validating, performing cryptographic operations with the encryption key included in the second copy of the encryption key file.

2. The method of claim 1, wherein different copies of the encryption key file at different key locations are subject to the validation operation during different loading operations.

3. The method of claim 1, wherein the storage media is included in a storage cartridge having a cartridge memory, wherein one copy of the encryption key file is stored in the cartridge memory, further comprising:
    performing a validation operation on the copy of the encryption key file in the cartridge memory in response to loading the removable storage media into a storage drive;
    performing a validation operation on the copy of the encryption key file at an accessed key location on the storage media in response to the copy of the encryption key file in the cartridge memory not validating;
    copying the copy of the encryption key file in the first key location into the cartridge memory in response to validating the copy of the encryption key file at the accessed key location; and
    performing a validation operation to validate the copy of the encryption key file at a next accessed key location on the storage media in response to not validating the copy of the encryption key file at the previously accessed key location.

4. The method of claim 3, wherein a number of loads and load interval is maintained for each key location including the copy of the encryption key file, further comprising:
    resetting the number of loads to zero for one key location in response to validating the copy of the encryption key file at the key location;
    determining at least one key location whose number of loads equals the load interval in response to loading the removable storage media into the storage drive;
    performing a validation operation on the copy of the encryption key file at the at least one determined key location whose number of loads equals the load interval; and
    incrementing the number of loads for each key location in response to validating all copies of the encryption key file subject to the validation operation.

5. The method of claim 1, wherein the encryption key file comprises a member of a set of encryption key files comprising: an encrypted encryption key; an unencrypted encryption key; a series of encrypted encryption keys; a series of unencrypted encryption keys.

6. A system coupled to removable storage media, comprising:
    a processor;
    an encryption engine; and
    Input/Output (I/O) manager code enabled to cause operations, the operations comprising:
        writing, in a forward direction, a first copy of the encryption key file to a first key location on a removable storage media;
        writing, in a reverse direction, a second copy of the encryption key file to a second key location of the removable storage media in which the first copy of the encryption key file was written in the forward direction;
        performing a validation operation on the first copy of the encryption key file written at the first key location;
        in response to the first copy of the encryption key file not validating, performing the validation operation on the second copy of the encryption key file written to the second key location; and
        in response to the second copy of the encryption key file written to the second key location validating, performing cryptographic operations with the encryption key included in the second copy of the encryption key file.

7. The system of claim 3, wherein different copies of the encryption key file at different key locations are subject to the validation operation during different loading operations.

8. The system of claim 3, wherein the storage media is included in a storage cartridge having a cartridge memory, wherein one copy of the encryption key file is stored in the cartridge memory, wherein the operations performed by the I/O manager further comprise:
    performing a validation operation on the copy of the encryption key file in the cartridge memory in response to loading the removable storage media into a storage drive;
    performing a validation operation on the copy of the encryption key file at an accessed key location on the storage media in response to the copy of the encryption key file in the cartridge memory not validating;
    copying the copy of the encryption key file in the first key location into the cartridge memory in response to validating the copy of the encryption key file at the accessed key location; and performing a validation operation to validate the copy of the encryption key file at a next accessed key location on the storage media in response to not validating the copy of the encryption key file at the previously accessed key location.

9. The system of claim 8, wherein a number of loads and load interval is maintained for each key location including the copy of the encryption key file, wherein the operations performed by the I/O manager further comprise:

resetting the number of loads to zero for one key location in response to validating the copy of the encryption key file at the key location;

determining at least one key location whose number of loads equals the load interval in response to loading the removable storage media into the storage drive; performing a validation operation on the copy of the encryption key file at the at least one determined key location whose number of loads equals the load interval; and incrementing the number of loads for each key location in response to validating all copies of the encryption key file subject to the validation operation.

10. The system of claim 3, wherein the encryption key file comprises a member of a set of encryption key files comprising: an encrypted encryption key; an unencrypted encryption key; a series of encrypted encryption keys; a series of unencrypted encryption keys.

11. The system of claim 3, further comprising:

at least one storage drive, wherein the encryption engine and I/O manager are included within each instance of the storage drive;

a storage array including a plurality of removable storage media capable;

an autochanger mechanism enabled to transfer removable storage media in the storage array to the at least one storage drive to couple the removable storage media to the at least one storage drive; and a controller to control operations of the storage drive and the autochanger mechanism.

12. A non-transitory computer readable storage medium including code to cause operations with respect to a removable storage media, the operations comprising:

maintaining an encryption key file, wherein data is capable of being encrypted and decrypted using an encryption key included in the encryption key file;

writing, in a forward direction, a first copy of the encryption key file to a first key location on a removable storage media;

writing, in a reverse direction, a second copy of the encryption key file to a second key location of the removable storage media in which the first copy of the encryption key file was written in the forward direction;

performing a validation operation on the first copy of the encryption key file written at the first key location;

in response to the first copy of the encryption key file not validating, performing the validation operation on the second copy of the encryption key file written to the second key location; and in response to the second copy of the encryption key file written to the second key location validating, performing cryptographic operations with the encryption key included in the second copy of the encryption key file.

13. The non-transitory computer readable storage medium of claim 12, wherein different copies of the encryption key file at different key locations are subject to the validation operation during different loading operations.

14. The non-transitory computer readable storage medium of claim 12, wherein the storage media is included in a storage cartridge having a cartridge memory, wherein one copy of the encryption key file is stored in the cartridge memory, further comprising:

performing a validation operation on the copy of the encryption key file in the cartridge memory in response to loading the removable storage media into a storage drive;

performing a validation operation on the copy of the encryption key file at an accessed key location on the storage media in response to the copy of the encryption key file in the cartridge memory not validating;

copying the copy of the encryption key file in the first key location into the cartridge memory in response to validating the copy of the encryption key file at the accessed key location; and performing a validation operation to validate the copy of the encryption key file at a next accessed key location on the storage media in response to not validating the copy of the encryption key file at the previously accessed key location.

15. The non-transitory computer readable storage medium of claim 14, wherein a number of loads and load interval is maintained for each key location including the copy of the encryption key file, further comprising:

resetting the number of loads to zero for one key location in response to validating the copy of the encryption key file at the key location;

determining at least one key location whose number of loads equals the load interval in response to loading the removable storage media into the storage drive; performing a validation operation on the copy of the encryption key file at the at least one determined key location whose number of loads equals the load interval; and incrementing the number of loads for each key location in response to validating all copies of the encryption key file subject to the validation operation.

16. The non-transitory computer readable storage medium of claim 12, wherein the encryption key file comprises a member of a set of encryption key files comprising: an encrypted encryption key; an unencrypted encryption key; a series of encrypted encryption keys; a series of unencrypted encryption keys.

* * * * *